United States Patent [19]

Tournoy

[11] 4,106,957

[45] Aug. 15, 1978

[54] REINFORCEMENTS

[75] Inventor: Willy Tournoy, Lodewijk, Belgium

[73] Assignee: N. V. Bekaert S.A., Zwevegem, Belgium

[21] Appl. No.: 284,496

[22] Filed: Aug. 29, 1972

[30] Foreign Application Priority Data

Sep. 2, 1971 [GB] United Kingdom ............... 41043/71

[51] Int. Cl.² ........................ B60C 9/02; C21D 9/34; C21D 9/52

[52] U.S. Cl. .................. 148/12 B; 148/12.4; 148/143; 148/153; 152/354 R; 152/356 R; 152/359; 152/361 R

[58] Field of Search .................... 148/153, 143, 12 B, 148/12.4; 29/193; 140/149; 152/354, 356, 359, 361 R

[56] References Cited

U.S. PATENT DOCUMENTS

| | | | |
|---|---|---|---|
| 3,217,838 | 11/1965 | Peterson et al. | 188/1 |
| 3,378,999 | 4/1968 | Roberts | 57/139 |
| 3,601,970 | 8/1971 | Roberts | 57/153 |
| 3,605,469 | 9/1971 | Queralto | 72/128 |
| 3,647,571 | 3/1972 | Okamoto | 148/12.3 |

*Primary Examiner*—W. Stallard
*Attorney, Agent, or Firm*—Shlesinger, Arkwright, Garvey and Dinsmore

[57] ABSTRACT

This invention relates to high carbon steel wire or cord suitable for use as a reinforcement for vehicle tires. By "high carbon steel" is meant here a steel of at least 0.2% C.

12 Claims, No Drawings

REINFORCEMENTS

HISTORICAL BACKGROUND

Since the requirements for vehicle tires have become more stringent, the tire industry has used hard drawn steel wire or cord as a reinforcement. The desired tensile strength of the wire or cord has been obtained by using a certain percentage of cross-sectional size reduction after the final step of patenting the wire or cord. This method has been favoured because the product seems to meet the various requirements imposed. The carbon content of the steel used usually ranges from 0.1 to 0.9% by weight, particularly from 0.6 to 0.8% C.

One requirement for steel reinforcements for tires is high tensile strength since in use a tire has to carry high loads which are compensated for by internal air pressure. The casing of the tire must be capable of withstanding such pressures.

Conventional tensile fabric filaments have tensile strengths of from about 20 to 90 kg/mm$^2$, while the tensile strength of hard drawn steel wire ranges from 250 to 400 kg/mm$^2$ where size reductions to from 90 to 99.8% of the wires initial diameter have been effected.

A further requirement for steel reinforcements to tires is good ductility of the individual wires or cords which form the reinforcement. In the first place, a minimum ductility should be present for avoiding brittleness. Also good ductility is believed to help in obtaining a good fatique resistance. Good fatique resistance is required for reinforcing wires and cords of vehicle tires, as during use cyclic forces of relatively high frequency are applied.

A high modulus of elasticity of the reinforcing wires or cords is highly desirable. Materials reinforced with wires or cords are generally capable of carrying greater loads and these are carried by the reinforcing material especially as the difference between the modulus of elasticity of the reinforcement material and the tire material increases. In this respect, steel is a very good material in comparison with the known synthetic filaments.

A high elastic limit is also required whereby a substantial force is required to bring about plastic deformation of the reinforcement. This can lead to increased stiffness of the rubber in which the wires or cords are embedded, and this is of special importance in the manufacture of large tires.

The creep resistance of the reinforcing material should be high even at elevated temperatures (e.g. up to 100° C). If the creep resistance is too low, there is a danger that the elongated reinforcing cord or wire will become detached from the rubber.

It is further desirable that the surface of the reinforcing material should bond to natural or synthetic rubber or at least adhere to a covering layer of a material which in turn itself adheres to rubber. Conventional brass coating on steel cord has been used to that purpose in the past, and can be used here in conjunction with the invention. The reinforcing material should further have good heat conductivity in order to produce good dissipation of the heat developed in the tread of the tire when in use.

Several materials have been used for reinforcing vehicle tires such as for example nylon, rayon or polyvinyl alcohol fibres, fiberglass, or polyester or carbon filaments. Multi-element steel wires and cords made from hard drawn steel elements which have been twisted together have also been used.

It has proved difficult to find materials which satisfactorily combine the various requirements for reinforcing elements and which can be produced at a reasonably cost. Steel has generally appeared to be most suitable for industrial production.

It is one object of the present invention to provide an improved steel wire or cord for vehicle tire reinforcements. The term "vehicle tire" is used herein in its broad sense to designate a tire for the load bearing wheels of any conveyance or vehicle such as for example a motor car, trailer, lorry aeroplane, agricultural tractor, crane or the like.

The present invention is based upon the discovery that steel wires and cords having a substantially martensitic crystal structure, this means more than 95% martensitic, and preferably more than 99%, and an elongation ability of from 3 to 10%, preferably from 3 to 8%, may with advantage be used as reinforcements for vehicle tires. Such reinforcing wires or cords are preferably used in the form of multi-element wires or cords made up of a plurality of wires or cords twisted together.

Elongation ability is the percentage elongation obtained in a 10cm length of wire at breakage, the wire having been subjected to a purely tensile force. How to obtain substantially martensitic steel having a given elongation ability in the range between 3 to 5% is known by those skilled in the art. This is a matter of conducting properly a heat treatment where the duration, and temperatures are the variables for controlling the degree of elongation ability and other qualities. The influence of these variables is given in atlases of metallurgy such like the Atlas zur Warmebehandlung der Stahle published by the VDI Verlag Stahleisen Düsseldorf. For instance, the wire or cord is heated to an austenitic crystal-structure then suddenly quenched at a temperature low enough to obtain substantial transformation to martensite and finally tempered to obtain the required elongation ability. This elongation ability results from two factors: on one hand, the longer the tempering time, the more the martinsitic structure is softened, and on the other hand, the shorter the quenching time, the greater the amount of residual untransformed austenite. The martensitic structure keeps the tensile strength at its required level, whilst the softening of the martensite and the residual austenite are responsible for the required elongation ability.

It has been found that the martensitic structure processed to an elongation ability between 3 and 10% not only combines a good strength and ductility, but also procures a very high fatigue resistance with respect to conventional sorbite hard drawn wires, so as to be very suitable for use as reinforcement in vehicle tires. Moreover, this is not obtained at the expense of modulus of elasticity, because the modulus of this material shows to be even higher than the modulus of conventional hard drawn wire. Creep resistance also is generally better. The transition temperature at which the steel becomes brittle is generally lower, enabling the wires or cords according to the invention to be used at temperatures as low, for example as −30° to −50° C. On the other hand, the advantage of steel of its good heat conductivity is retained. Conventional brass coating can still be used for obtaining the bond to rubber. Furthermore, hard drawn sorbitic wire or cord often has more residual stresses in its outer surface than martensitic wire or cord, the stresses being formed in the transformation from an austenitic structure which was without stress. It is believed that the low residual surface stresses in the martensitic steel used in the present invention combined with good ductility gives rise to the high fatique resistance observed in the reinforcing wires or cords of the present invention.

Processing to an elongation ability more than 10% generally includes a fall of elastic limit under the necessary values for obtaining a cord that can be processed in carcass weaving machines and the like.

This method, besides the above mentioned advantages, also permits to get free from the univocal relation between tensile strength and ductility of the conventional cold drawing method, and so to come to more suitable and better combinations of tensile strength and ductility, by using a favourable combination of quenching and tempering time and temperature. The desired tensile strength in reinforcing wires has hitherto been obtained by cold drawing sorbitic steel wire in a number of drawing steps. Each drawing step adds to the tensile strength of the wire, but this has occurred at the expense of ductility. Drawing a wire having a given carbon content provides certain values for tensile strength and ductility which are unambiguously determined by the percentage reduction of the cross-sectional area of the wire following the last patenting operation. When a certain tensile strength was desired, a substantial loss of ductility had necessarily to be accepted.

Tempered martensitic steel generally has the advantage that the tensile strength and ductility, for a given carbon content, depend both upon the tempering temperature and upon the tempering time. A careful control of each of these factors permits various combinations of tensile strength and ductility to be obtained. When tempering a martensitic steel wire, a desired and advantageous ductility for use in vehicle tires may be sought. The required combination of tempering time and temperature to be used in order to obtain the desired ductility with at least the minimum necessary tensile strength will generally be apparent to those skilled in the art. A part of the tensile strength may be relinquished indeed when this part is not essential. The reinforcement wires or cords according to the invention thus have a martensitic structure and a ductility to which the steel has been tempered.

The present invention also provides a process for producing steel reinforcement wires or cords suitable for use as reinforcements in vehicle tires which comprises heat treating a bundle of hard drawn pearlite wires or cords whereby austentic wires or cords are formed, rapidly quenching the austenitic wires or cords to produce substantially martensitic wires or cords and annealing the martensitic wires or cords at a temperature and for a time sufficient to provide the annealed wires with an elongation ability of from 3 to 10%, preferably 3 to 8%.

Vehicle tires produced using steel reinforcing wires or cords according to the invention are also within the scope of the present invention and may be produced according to known methods. The wire or cord made according to the invention will then be embedded into the rubber mass of a vulcanizing tire.

The wire or cord used in the present invention is high carbon steel, and preferably in the range of 0.6 to 0.8% carbon, and possibily comprising the conventional elements, such like manganese and silicon, for enhancing some specifically required properties, as known by those skilled in the art, and further comprising impurities in minor amount. The steel may be shaped to its diameter by any known method, for example by drawing. Indeed any method of producing cord or wire may be used provided an adequately smooth surface which is sufficiently free from internal stresses to give a satisfactory fatique resistance is obtained. The wire or cord may be heat treated either before or after twisting to form a multifilament wire or cord. A heat treatment after twisting is generally preferred since in one operation all the filaments are treated simultaneously. Furthermore, the internal tensions due to the twisting operation are in general removed in the recrystallization to form austenite. This usually results in the ends of the multifilament wire or cord having little or no tendency to untwist. The result is usually a wire or cord which holds its form. However, separate wires or cords may be treated and subsequently combined.

The following Examples are given by way of illustration only. Steel cords were used in each Example which consisted of strands of four helically twisted wires. All the wires making up the cord contained 0.7% C, 1% Mn and 0.2% Si, with the balance being iron and impurities. The wires had a diameter of 5.5 mm and they were cold drawn in known manner on conventional wire drawing machines and using conventional methods of dry or wet drawing, intermediate patenting etc. The final diameter of the wires was 9.2 mm.

EXAMPLE 1

The above described wires, after twisting to form a cord, were passed through an austenizing furnace of 5.50 meters length at a temperature of 800° C. The wires are protected from oxydation by a suitable reducing atmosphere, such like cracked ammonia-gas. The speed of the cord was 66 meters per minute through the furnace which gave a heating time of about 5 seconds. On leaving the austenizing furnace the cord was passed into a conventional oil-quenching bath where it was quenched to a temperature of about 20° to 60° C. The austenite was there transformed into martensite. Subsequently the cord was tempered by feeding it at the same speed through a lead bath at a temperature of 330° to 340° C. The immersion length was 3.50 meters and the tempering time was about 3.2 seconds. This wire was then air-cooled and reeled up on spools for use in conventional twisting machines for the production of reinforcing cords.

EXAMPLE 2

A heat treating process as described in Example 1 was effected but with the austenizing furnace at 820° C and the tempering bath at 350° to 360° C. The wires were of the type described in Example 1.

EXAMPLE 3

A heat treating process as described in Example 1 was effected but with the speed at 90 m/min, the austenizing temperature at 900° to 1000° C, and the tempering temperature at 400° C. The wires were of the type described in Example 1.

EXAMPLE 4

A heat treating process as described in Example 1 was effected on wire, after drawing and before bunching or twisting to form a cord. The wire was subsequently heat treated as described in Example 1 at a speed of 65 m/min, an austenizing temperature of 850° C and a tempering temperature of 300° C.

EXAMPLE 5

As a control, a cord using wires according to Example 4 as obtained before heat treatment was used. The wires were twisted in a conventional twisting machine. The following results were obtained.

TABLE I

|  | Tensile strength (kg/mm²) | Elongation ability (%) | Fatique resistance (kg/mm²) | Transition Temperature for brittleness (° C) |
| --- | --- | --- | --- | --- |
| Example 5 (control) | 240 – 250 | 1.5 – 2.5 | 85 – 105 | 0 to −20 |
| Example 1 | 250 – 270 | 6.5 – 8 | 130 – 160 | < −30 |
| Example 2 | 230 – 250 | 4 – 6.5 | 110 – 130 | < −30 |
| Example 3 | 190 – 210 | 6 – 8 | 90 – 110 | < −30 |
| Example 4 | 240 – 250 | 4 – 5.5 | 85 – 105 | < −30 |

The two values given in each case are the limits of a range of observed values. The fatique resistance was measured by the well-known Hunter wire fatique test.

The quenching and tempering times are not critical but must be adapted to the diameter and the desired quality. As an example, wire drawn by conventional methods to 0.12 mm diameter, and then austenizing during a sufficient time at 800° C, is subsequently quenched in an oil-bath at 60° and then tempered in a lead bath of 3.50 meter length. The wire runs in line through the quenching and tempering bath, at different speeds. At low speeds the structure is better quenched and better tempered, and at higher speeds there is more residual austenite in a less tempered martensite structure. As for elongation ability, both effects about cancel each other so giving an elongation ability which comparatively does not change very much. The results however will show that an elongation ability beyond 8%, which still gives a good fatique resistance, is only interesting when the low limit of elasticity is of less importance. The results also will show that on an average the most preferred quality will be obtained for elongation abilities between 5 and 8%. The results are summarized in Table II with sample 1 being for heat treatment on a wire of 0.40 mm diameter and sample 2, for the heat treatment on a cable of four strands of seven 0.12 mm wires each. It is to be noted that the austenizing operation on a single thin wire of 0.12 mm, without that wire burning through is very difficult.

TABLE II

| Sample No. | 1 | | | | | 2 | | | | |
| --- | --- | --- | --- | --- | --- | --- | --- | --- | --- | --- |
| Speed (m/min) | 44 | 60 | 77 | 92 | 110 | 44 | 60 | 77 | 92 | 110 |
| Tensil Strength (kg/mm2) | 262 | 266 | 270 | 274 | 278 | 213 | 178 | 171 | 166 | 165 |
| 0.2% Yield strength kg/mm2) | 197 | 182 | 171 | 160 | 151 | 124 | 122 | 120 | 118 | 116 |
| Modulus of Elasticity (kg/mm2) | 19700 | 19700 | 20100 | 19600 | 19600 | 15700 | 16100 | 15800 | 14900 | 13900 |
| Elongation ability (%) | 7.2 | 7.4 | 7.7 | 7.9 | 8.1 | 5.6 | 7.1 | 7.2 | 6.3 | 6.0 |

Other cord structures may, if desired, be used, for example with up to 25, 40 or even more thin filaments. The greater the subdivision of the steel material, the more flexible a cord of the material becomes. However, when this material is martensite steel, good properties for tire reinforcements are generally present.

While this invention has been described, it will be understood that it is capable of further modificaton, and this application is intended to cover any variations, used and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

I claim:

1. A high carbon steel cord for reinforcement of vehicle tires, characterized in that it comprises a number of wires having a substantially martensitic crystal structure of an elongation ability ranging between 3 and 10%.

2. Steel cord according to claim 1, characterized in that said elongation ability ranges between 3 and 8%.

3. Vehicle tire including high carbon steel cord as a reinforcement, characterized in that said cord is made of steel having a substantially martensitic crystal structure of an elongation ability ranging between 3 and 10%.

4. Vehicle tire according to claim 3, characterized in that said elongation ability ranges between 3 and 8%.

5. A method of making steel wire for reinforcement in vehicle tires, the method comprising heat treating a high carbon steel wire whereby an austenitic wire is formed, rapidly quenching the austenitic wire to a substantially martensitic structure, and annealing the substantially martensitic wire to provide it with an elongation ability of from 3 to 10%.

6. A method for making steel cord for reinforcement in vehicle tires, the method comprising bundling to cord a number of high carbon steel wires, heat treating the cord whereby austenitic cord is formed, rapidly quenching the austenitic cord to a substantially martensite structure and annealing the substantially martensitic cord to provide it with an elongation ability of from 3 to 10%.

7. A method according to claim 5 characterized in that said elongation ability ranges between 3 abd 8%.

8. A method according to claim 6 characterized in that said elongation ability ranges between 3 and 8%.

9. A method according to claim 5, characterized in that said high carbon steel wires are obtained by cold drawing of pearlitic steel wire rods.

10. A method according to claim 6, characterized in that said high carbon steel wires are obtained by cold drawing of pearlitic steel wire rods.

11. A method according to claim 7, characterized in that said high carbon steel wires are obtained by cold drawing of pearlitic steel wire rods.

12. A high carbon steel wire or cord for reinforcement of vehicle tires, characterized in that said high carbon steel has a substantially martensitic crystal structure of an elongation ability ranging between 3 and 10%.

* * * * *